(12) United States Patent
Ueda et al.

(10) Patent No.: US 11,338,997 B2
(45) Date of Patent: May 24, 2022

(54) TRANSPORT VEHICLE AND TRANSPORT FACILITY

(71) Applicant: Daifuku Co., Ltd., Osaka (JP)

(72) Inventors: Yuichi Ueda, Hinocho (JP); Masashige Iwata, Hinocho (JP); Akira Emoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 140 days.

(21) Appl. No.: 16/644,000

(22) PCT Filed: Jul. 31, 2018

(86) PCT No.: PCT/JP2018/028586
§ 371 (c)(1),
(2) Date: Mar. 3, 2020

(87) PCT Pub. No.: WO2019/049557
PCT Pub. Date: Mar. 14, 2019

(65) Prior Publication Data
US 2021/0061563 A1    Mar. 4, 2021

(30) Foreign Application Priority Data

Sep. 6, 2017 (JP) .............................. JP2017-171257

(51) Int. Cl.
*B65G 1/04* (2006.01)
*B65G 1/137* (2006.01)
*G05D 1/02* (2020.01)

(52) U.S. Cl.
CPC ........... *B65G 1/0492* (2013.01); *B65G 1/137* (2013.01); *G05D 1/0212* (2013.01); *B65G 2201/0235* (2013.01); *G05D 2201/0216* (2013.01)

(58) Field of Classification Search
None
See application file for complete search history.

(56) References Cited

U.S. PATENT DOCUMENTS 4,492,504 A * 1/1985 Hainsworth .............. B66F 9/07
    414/273
4,678,390 A * 7/1987 Bonneton ............ B65G 1/1375
    294/4
10,065,798 B2 * 9/2018 Borders ................. B65G 65/00
(Continued)

FOREIGN PATENT DOCUMENTS

DE    102015220091 A1    4/2017
EP       3170771 A1    5/2017
(Continued)

Primary Examiner — Mark C Hageman
(74) Attorney, Agent, or Firm — The Webb Law Firm

(57) ABSTRACT

A transport vehicle (2) is provided with: a support region (22) where a container (W) is supported; a container transfer apparatus (24) that inserts/takes a container (W) into/out of a container shelf; a recognition apparatus (27) that recognizes at least one of an article stored in a container (W) in a first state in which the container (W) is supported in the support region (22) and an article stored in a container (W) in a second state in which the container (W) is supported by the container transfer apparatus (24); and an article transfer apparatus (26) that transfers an article recognized by the recognition apparatus (27) between a container (W) in the first state and a container (W) in the second state.

9 Claims, 10 Drawing Sheets

(56) References Cited

U.S. PATENT DOCUMENTS

| | | | |
|---|---|---|---|
| 10,227,176 B2* | 3/2019 | Sugahara | B25J 5/007 |
| 10,315,843 B2* | 6/2019 | Magens | B65G 1/0492 |
| 2011/0238207 A1 | 9/2011 | Bastian, II et al. | |
| 2015/0098775 A1* | 4/2015 | Razumov | B65G 1/0464 |
| | | | 414/282 |
| 2017/0107055 A1 | 4/2017 | Magens et al. | |
| 2017/0137221 A1 | 5/2017 | Koide | |

FOREIGN PATENT DOCUMENTS

| | | | |
|---|---|---|---|
| JP | 62259905 A | 11/1967 |
| JP | 4926979 | 3/1974 |
| JP | 543013 A | 2/1993 |
| JP | 6115614 A | 4/1994 |
| JP | 2004277062 A | 10/2004 |
| JP | 2006341968 A | 12/2006 |
| JP | 2011173673 A | 9/2011 |
| JP | 2013133220 A | 7/2013 |
| JP | 201540121 A | 3/2015 |

* cited by examiner

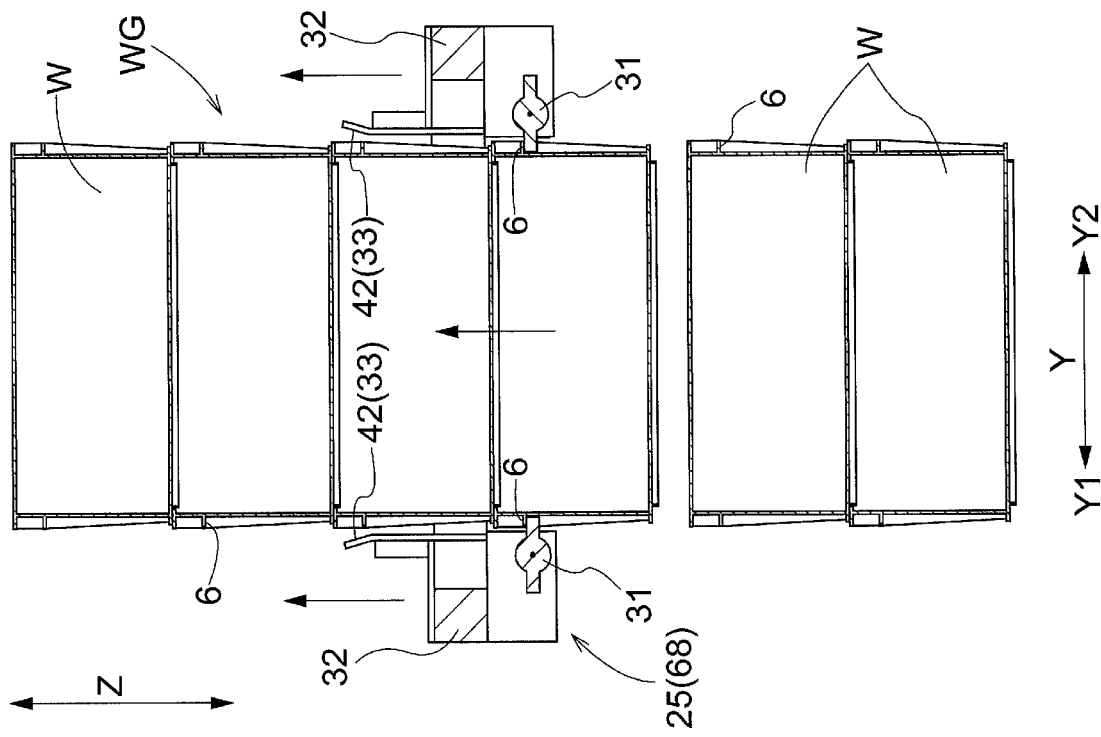
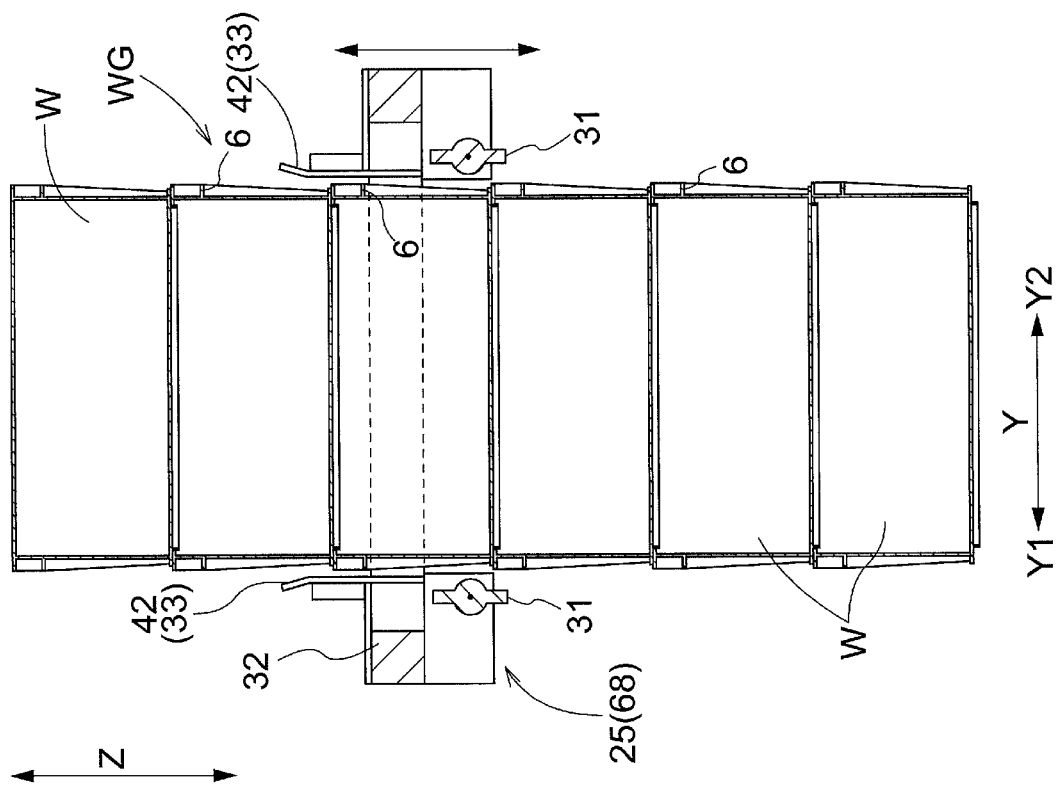

TRANSPORT VEHICLE AND TRANSPORT FACILITY

CROSS-REFERENCE TO RELATED APPLICATIONS

This application is the United States national phase of International Application No. PCT/JP2018/028586 filed Jul. 31, 2018, and claims priority to Japanese Patent Application No. 2017-171257 filed Sep. 6, 2017, the disclosures of which are hereby incorporated by reference in their entirety.

BACKGROUND OF THE INVENTION

Field of the Invention

The present invention relates to a transport vehicle that travels along a container shelf provided with a plurality of levels of shelf portions arranged in the vertical direction and configured to support containers, thereby transporting the containers, and also relates to a transport facility provided with a plurality of such transport vehicles.

Description of Related Art

An example of the above sort of transport facility is described in JP 2004-277062A (Patent Document 1). A transport vehicle provided in the transport facility of Patent Document 1 is provided with a transfer robot 6 that inserts/takes a container into/out of a container shelf. When performing container transport, the transport vehicle uses the transfer robot 6 to remove the container from the container shelf while the transport vehicle is in a state stopped in front of the container shelf, and travels to the front of another container shelf in a state where the transfer robot 6 is supporting the container, and then stores the container being supported by the transfer robot 6 on that other container shelf.

SUMMARY OF THE INVENTION

In the transport facility described above, when removing an article stored in a container on a container shelf, or when storing an article in a container on a container shelf, the container is removed from the container shelf by the transport vehicle and transported to a place where picking work is performed. Then, picking work of storing the article in the container or remove the article from the container is performed. Then, the container for which the picking work has been completed is loaded on the transport vehicle, transported to a container shelf, and stored. As described above, when storing an article in a container or removing an article from a container, it is necessary to temporarily transport the container to the place where the picking work is to be performed, so it is not possible to efficiently store or remove an article with respect to a container.

Consequently, realization of a transport vehicle that can efficiently store or remove articles with respect to containers, and a transport facility provided with a plurality of such transport vehicles, is desired.

A transport vehicle according to the present disclosure travels along a container shelf provided with a plurality of levels of shelf portions arranged in a vertical direction and configured to support containers, thereby transporting the containers.

The transport vehicle is provided with a support region where a container is supported; a container transfer apparatus that inserts/takes a container into/out of the container shelf; a recognition apparatus that recognizes at least one of an article stored in a container in a first state in which the container is supported in the support region and an article stored in a container in a second state in which the container is supported by the container transfer apparatus; and an article transfer apparatus that transfers an article recognized by the recognition apparatus between a container in the first state and a container in the second state.

According to this configuration, a container that has been removed from the container shelf by the container transfer apparatus is supported by the container transfer apparatus. Also, by the article transfer apparatus, an article can be transferred between a container in the second state in which the container is supported by the container transfer apparatus in this way, and a container in the first state in which the container is supported in the support region. Then, the container in the second state for which removal or storage of the article is completed can be stored on the container shelf by the container transfer apparatus.

Thus, with respect to a container that has been removed from the container shelf by the container transfer apparatus, removal or storage of an article can be performed in the transport vehicle. Therefore, it is not necessary to transport a container that has been removed from the container shelf with the transport vehicle, and as a result it is possible to efficiently store an article in the container or remove an article from the container.

BRIEF DESCRIPTION OF THE DRAWINGS

FIG. 5 is a vertical front view of the lifting mechanism showing a state in which support portions have been set to a support position.
FIG. 6 is a vertical front view of the lifting mechanism showing a state in which the support portions have been set to an evacuated position.

DESCRIPTION OF THE INVENTION

1. Embodiment

An embodiment of a transport facility provided with a plurality of transport vehicles will be described with reference to the drawings.

Figure 1:
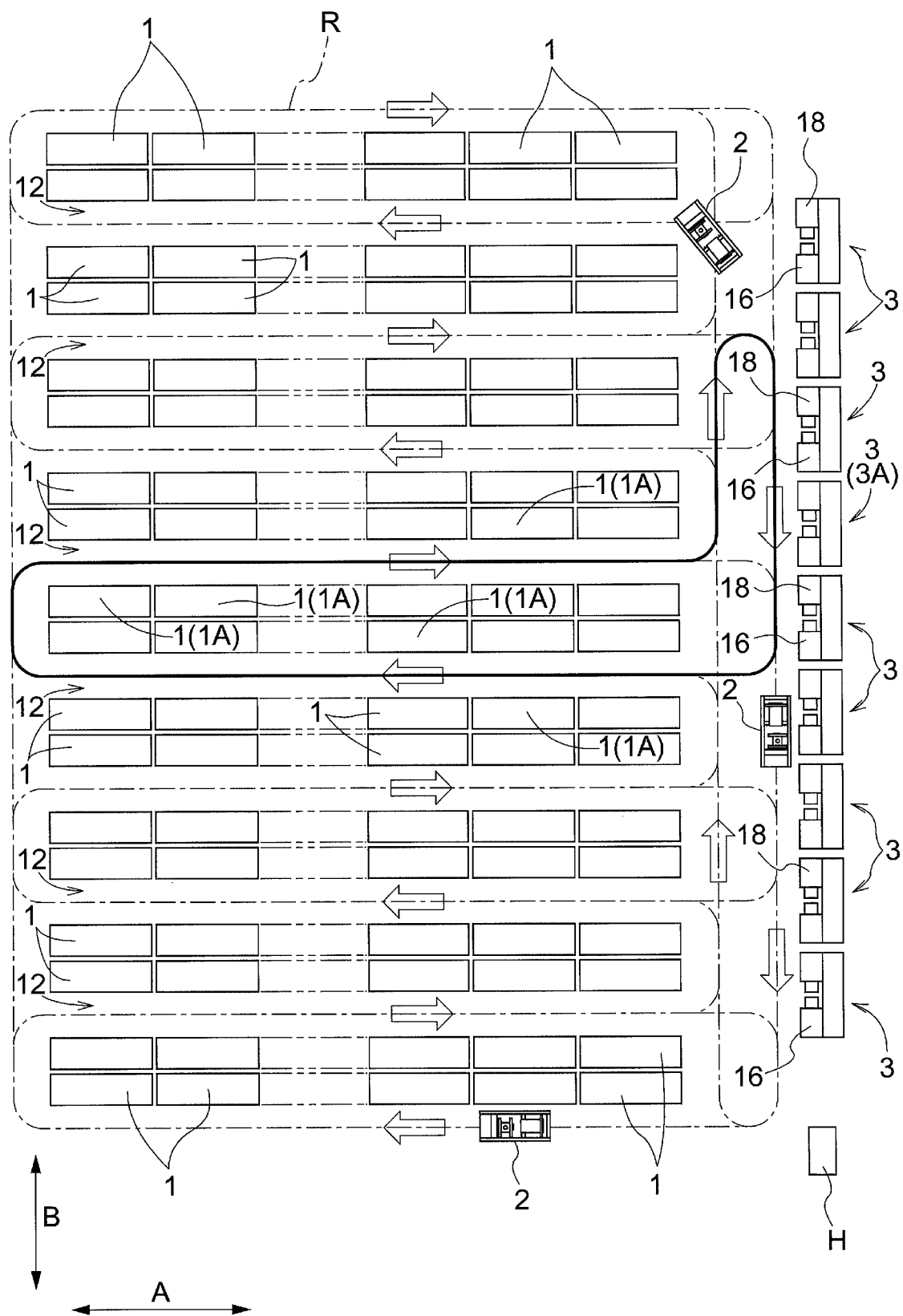
FIG. 1 is a plan view of a transport facility.

As shown in FIG. 1, the transport facility includes a plurality of container shelves 1 that store containers W, a plurality of transport vehicles 2 that transport the containers W, carry-in/carry-out units 3 that perform carry-in transport and carry-out transport of a container group WG in which the containers W have been stacked in a vertical direction Z, and a control apparatus H that controls the plurality of transport vehicles 2.

Figure 2:
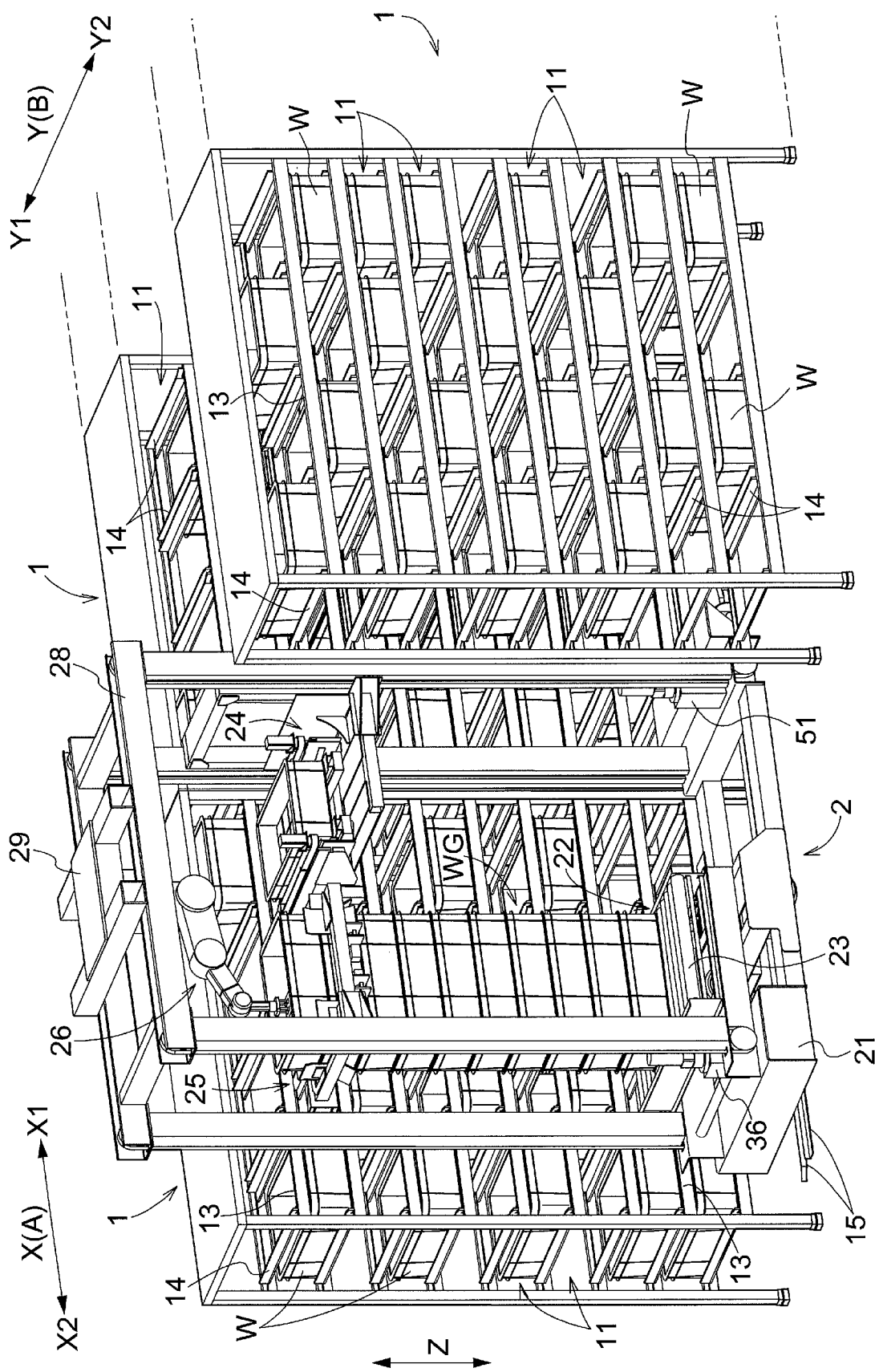
FIG. 2 is a perspective view of a transport vehicle and container shelves.
Figure 3:
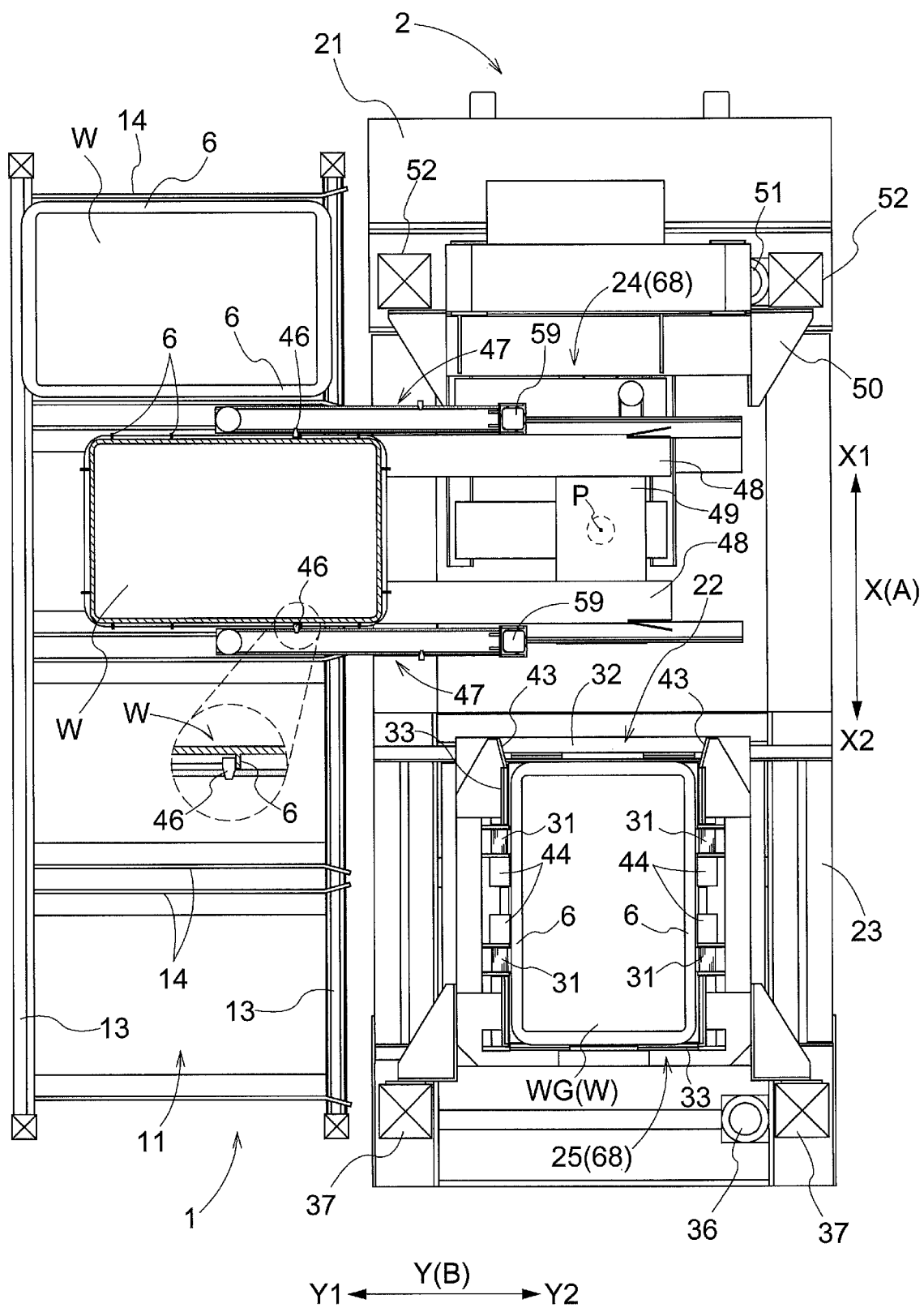
FIG. 3 is a plan view of the transport vehicle and the container shelves.
Figure 4:
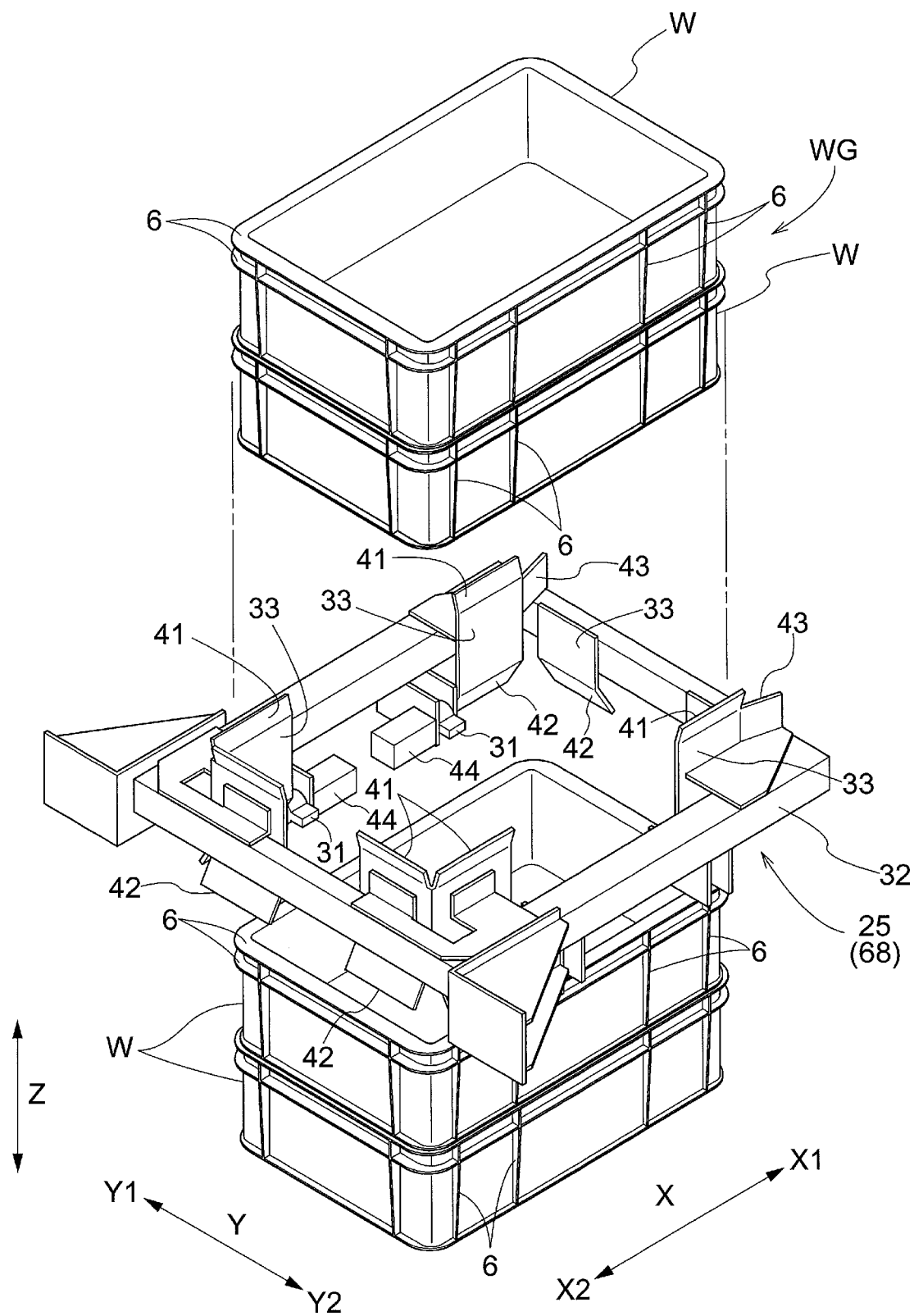
FIG. 4 is a perspective view of a lifting mechanism.

As shown in FIGS. 2 and 4, each container W is formed by erecting side wall portions at the periphery of a bottom portion, and is formed in a box shape with an open upper face. In this example, a non-deformable container configured with a resin material is used as the container W. Side wall portions of the container W are provided with protruding portions 6 (ribs) formed in a longitudinal direction of the container W, and protruding portions 6 (ribs) formed in the vertical direction Z of the container W. In this example, by holding portions 46 of the container transfer apparatus 24 engaging with the protruding portions 6, the container W can be moved in the horizontal direction or lifted by the container transfer apparatus 24. Note that the container W being transferred by the container transfer apparatus 24 in FIG. 3 is shown partly cut away in a cross-section in order to show the protruding portions 6 formed in the vertical direction Z.

As shown in FIGS. 2 and 4, an upper end portion of the container W and a lower end portion of another container W are configured to be capable of fitting together in the vertical direction Z, and thus the containers W are configured to be capable of stacking in the vertical direction Z. Incidentally, the containers W are configured such that when the containers W are stacked, a storage space is formed between the bottom portion of one container W and the bottom portion of another container W that has been stacked above that one container W, and a container W can be stacked in a state where an article has been stored in the container W.

Container Shelf

The container shelf 1 is provided with a plurality of levels of shelf portions 11 arranged in the vertical direction Z and configured to support the containers W. A plurality of the containers W that are not stacked can be supported on the shelf portions 11 in a state lined up in a shelf width direction A of the container shelf 1.

As shown in FIG. 1, a plurality of the container shelves 1 are installed in an attitude following along the shelf width direction A. Two of the container shelves 1 whose front faces oppose each other are installed in a state spaced apart from each other in a shelf depth direction B. An inter-shelf passageway 12 is formed between these two container shelves 1, and the inter-shelf passageway 12 is used as a passageway through which the transport vehicles 2 travel. The plurality of container shelves 1 in an attitude following along the shelf width direction A are lined up in the shelf depth direction B, and the plurality of container shelves 1 are disposed such that a plurality of the inter-shelf passageways 12 are formed. When a transport vehicle 2 travels through an inter-shelf passageway 12, the transport vehicle 2 travels along the front face of the container shelves 1. Incidentally, an inter-shelf passageway 12 is not formed between two container shelves 1 whose rear faces are facing each other.

A direction following along the longitudinal direction of the container shelves 1 is referred to as the shelf width direction A, and a direction perpendicular to the shelf width direction A when viewed from the vertical direction Z is referred to as the shelf depth direction B. Also, a face of the container shelf 1 that faces the inter-shelf passageway 12 is referred to as a front face, and a face on the opposite side as the face of the container shelf 1 that faces the inter-shelf passageway 12 is referred to as a rear face.

As shown in FIG. 2, the shelf portion 11 is provided with a first restriction body 13 and a second restriction body 14. The first restriction body 13 is provided so as to be positioned on both sides in the shelf depth direction B with respect to the container W supported by the shelf portion 11, and the second restriction body 14 is provided so as to be positioned on both sides in the shelf width direction A with respect to the container W supported by the shelf portion 11. The container W supported by the shelf portion 11 is restricted from moving in the shelf depth direction B by the first restriction body 13, and is restricted from moving in the shelf width direction A by the second restriction body 14.

At the front of the shelf portion 11, a guide rail 15 is installed in the shelf width direction A. The transport vehicle 2, which travels along the front of the shelf portion 11, travels in the shelf width direction A through the inter-shelf passageway 12 in a state in which movement in the shelf depth direction B is restricted by the guide rail 15.

The carry-in/carry-out unit 3 is provided with a carry-in unit 16 and a carry-out unit 18. A container group WG, in which a plurality of the containers W where articles are not stored are stacked in the vertical direction Z, is carried into the carry-in unit 16. The containers W constituting the container group WG carried into the carry-in unit 16 are placed on the transport vehicle 2, and articles are stored in these containers W by picking work performed by the transport vehicle 2. After the articles are stored in the plurality of containers W constituting the container group WG placed on the transport vehicle 2, the transport vehicle 2 transports the container group WG in which the articles have been stored to the carry-out unit 18. Note that the plurality of containers W (the container group WG) to be placed on the transport vehicle 2 from the carry-in unit 16 are empty containers W in which articles have not been stored. The plurality of containers W (the container group WG) to be transported from the transport vehicle 2 to the carry-out unit 18 are actual containers W in which articles have been stored.

Transport Vehicle

As shown in FIGS. 2 and 3, the transport vehicle 2 is provided with a traveling unit 21 that travels on the floor, a conveyor 23 installed in a support region 22 where the containers W are supported in a stacked state and that supports the containers W in the support region 22, a container transfer apparatus 24 that transfers the containers W, and a lifting mechanism 25 that lifts a container W at any height among the container group WG stacked in the support region 22 with respect to a container W lower than the container W at that any height. The container transfer apparatus 24 is installed in a state adjacent to the support region 22 on a front-rear direction first side X1 when the transport vehicle 2 travels along the front face of the container shelf 1. The container transfer apparatus 24 transfers the containers W supported by the shelf portions 11 to the support region 22, and transfers the containers W supported in the support region 22 to the shelf portions 11. In the following description of the transport vehicle 2, in a state where the transport vehicle 2 is positioned in the inter-shelf passageway 12, that is, in a state in which the transport vehicle 2 is traveling along the front face of the container shelf 1, the direction following along the shelf width direction A is referred to as a front-rear direction X, a direction to one side in the front-rear direction X is referred to as a front-rear direction first side X1, and a direction to the opposite side as the front-rear direction first side X1 is referred to as a front-rear direction second side X2. Also, the direction following along the shelf depth direction B and orthogonal to the front-rear direction X when viewed from the vertical direction Z is referred to as a left-right direction Y, a direction to one side in the left-right direction Y is referred to as a left-right direction first side Y1, and a direction to the opposite side as the left-right direction first side Y1 is referred to as a left-right direction second side Y2.

The container group WG in the support region 22 is supported on a transport face of the conveyor 23. That is, in the transport vehicle 2, the support region 22 where the containers W are supported in a stacked state is formed on the conveyor 23.

The conveyor 23 is installed so as to transport the container group WG in the left-right direction Y. Therefore, the container group WG of the carry-in unit 16 can be transported on the conveyor 23 by operating the conveyor 23 in a state where the transport vehicle 2 has been stopped such that the carry-in unit 16 is adjacent to the transport vehicle 2 in the left-right direction Y. Also, the container group WG on the conveyor 23 can be transported to the carry-out unit 18 by operating the conveyor 23 in a state where the transport vehicle 2 has been stopped such that the carry-out unit 18 is adjacent to the transport vehicle 2 in the left-right direction Y.

Figure 9:
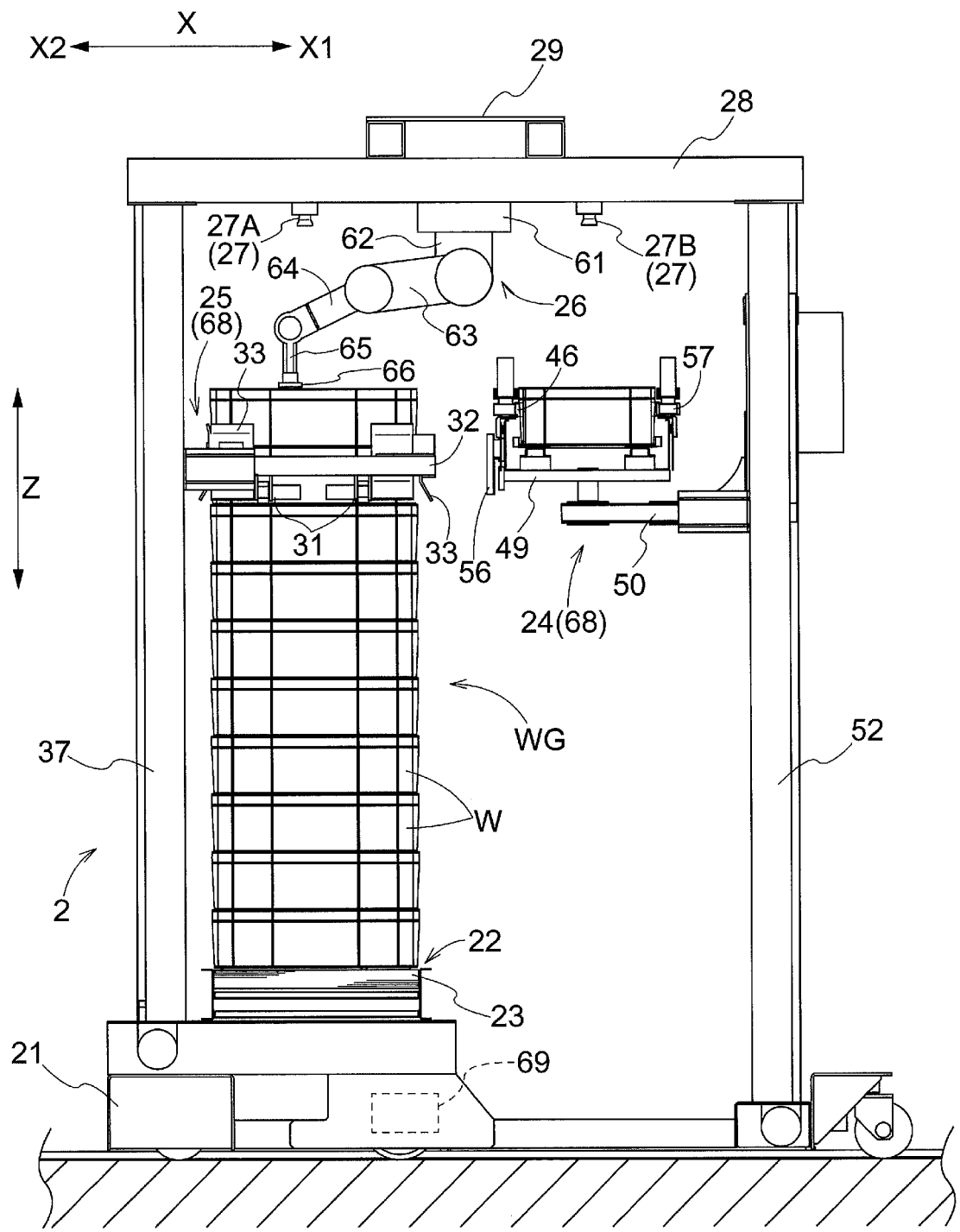
FIG. 9 is a side view of the transport vehicle.

Also, as shown in FIG. 9, the transport vehicle 2 is provided with a recognition apparatus 27 that recognizes both an article stored in a container W in a first state in which the container W is supported in the support region 22 and an article stored in a container W in a second state in which the container W is supported by the container transfer apparatus 24.

The recognition apparatus 27 is provided with a first image capturing apparatus 27A that captures an image of a container W in the first state from above to recognize an article being stored in the container W in the first state, and a second image capturing apparatus 27B that captures an image of a container W in the second state from above to recognize an article being stored in the container W in the second state.

The first image capturing apparatus 27A is installed above the container group WG supported in the support region 22, and is installed such that an image of the container W positioned uppermost in the container group WG can be captured from above.

The second image capturing apparatus 27B is installed above the raising/lowering movement range of the container transfer apparatus 24, and is installed such that in a state where the container transfer apparatus 24 (see FIG. 10) has been positioned at a set height, an image of the container W supported by the container transfer apparatus 24 can be captured.

The first image capturing apparatus 27A and the second image capturing apparatus 27B are supported by an upper frame 28 spanning across the upper end of a first mast 37 and the upper end of a second mast 52.

Lifting Mechanism

As shown in FIG. 4, the lifting mechanism 25 lifts a container W at any height among the container group WG supported in the support region 22 with respect to a container W lower than the container W at that any height. The lifting mechanism 25 is provided with support portions 31 that support the container W, a raising/lowering unit 32 that supports the support portions 31 and moves in the vertical direction Z, and guide portions 33 that guide the container W in the support region 22 to an appropriate position.

The raising/lowering unit 32 is configured using a frame constructed in a rectangular shape when viewed from the vertical direction Z, and is positioned so as to surround the container W in the support region 22 when viewed from the vertical direction Z. The raising/lowering unit 32 moves in the vertical direction Z along first masts 37 erected on the traveling unit 21 due to driving by a first motor 36.

As shown in FIG. 4, the guide portions 33 are supported by the raising/lowering unit 32, and when the raising/lowering unit 32 is moved in the vertical direction Z, the guide portions 33 come into contact with the container W in the support region 22 and guide the container W to an appropriate position in the support region 22. More specifically, the guide portions 33 are provided with first guide portions 41 and second guide portions 42. The first guide portions 41 are provided in a part of the guide portions 33 that protrudes upward from the raising/lowering unit 32. The second guide portions 42 are provided in a part of the guide portions 33 that protrudes downward from the raising/lowering unit 32. The first guide portions 41 are provided so as to be positioned on the front-rear direction second side X2 and on both sides in the left-right direction Y with respect to the container W at an appropriate position when viewed from vertical direction Z. The second guide portions 42 are provided so as to be positioned on both sides in the front-rear direction X and on both sides in the left-right direction Y with respect to the container W at an appropriate position when viewed from the vertical direction Z.

The first guide portions 41 are provided with an inclined face that slopes away from the container W at an appropriate position toward the upper side. When the raising/lowering unit 32 moves upward, in a case where a container W displaced in the horizontal direction from the appropriate position exists in the container group WG in the support region 22, the inclined face of the first guide portions 41 comes into contact with the container W and guides the container W to the side of the appropriate position. As a result, the container W displaced from the appropriate position can be moved to the appropriate position.

Also, the second guide portions 42 are provided with an inclined face that slopes away from the container W at an appropriate position toward the lower side. When the raising/lowering unit 32 moves downward, when a container W displaced in the horizontal direction from the appropriate position exists in the container group WG in the support region 22, the inclined face of the second guide portions 42 comes into contact with the container W and guides the container W to the side of the appropriate position. As a result, the container W displaced from the appropriate position can be moved to the appropriate position.

Note that the appropriate position of the container W is a position of the container W set in advance in the support region 22, and the appropriate positions of the plurality of containers W in a stacked state are the same position when viewed from the vertical direction Z.

Figure 10:
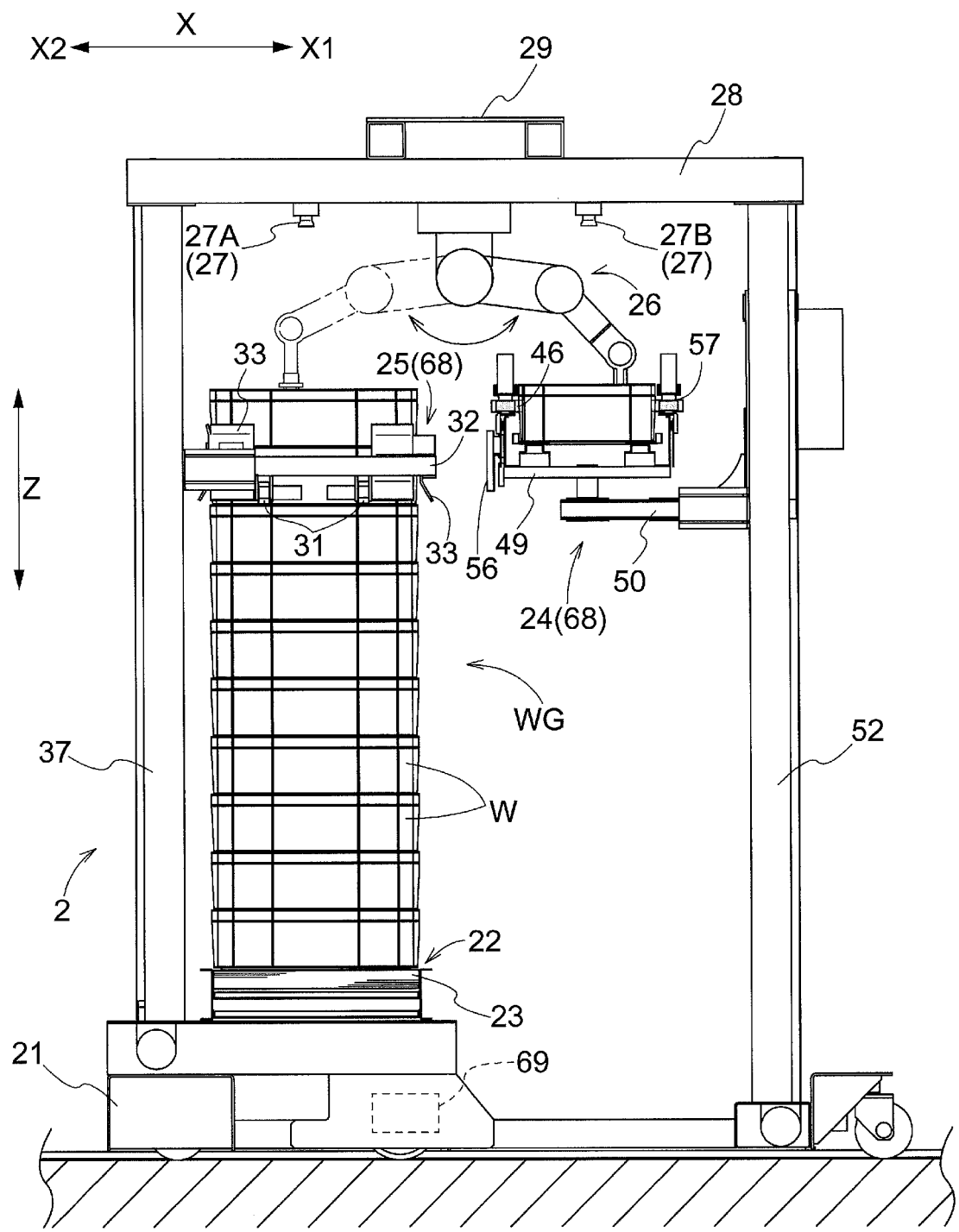
FIG. 10 is a side view of the transport vehicle showing a state in which an article is being transferred by an article transfer apparatus.

The lifting mechanism 25 is provided with a third guide portion 43. The third guide portion 43 is supported by the raising/lowering unit 32 so as to be positioned above the raising/lowering unit 32. The third guide portion 43 is provided with an inclined face that slopes away from the container W at an appropriate position in the left-right direction Y toward the front-rear direction first side X1. As shown in FIG. 10, when loading the container W in the container group WG in the support region 22 using the container transfer apparatus 24, in a case where the container W is displaced in the left-right direction Y from the appropriate position, the inclined face of the third guide portion 43 comes into contact with the container W and moves the container W to the appropriate position in the left-right direction Y.

As shown in FIGS. 4 to 6, the support portions 31 are configured to be movable between a support position (see FIGS. 4 and 5) where the support portions 31 overlap the protruding portions 6 of the container W in the support region 22 when viewed from the vertical direction Z, and an evacuated position (see FIG. 6) where the support portions 31 do not overlap the container W in the support region 22 when viewed from the vertical direction Z. More specifically, the support portions 31 are formed in a plate shape in which the center bulges outward, and by rotating around an axis in the front-rear direction X due to driving by a second motor 44, the support portions 31 move between the support position where the support portions 31 are rotated to be arranged along the front-rear direction X and the left-right direction Y, and the evacuated position where the support portions 31 are rotated to be arranged along the front-rear direction X and the vertical direction Z.

As shown in FIG. 6, by setting the support portions 31 to the evacuated position, the lifting mechanism 25 can prevent the support portions 31 from contacting the container group WG in the support region 22 when the raising/lowering unit 32 is moved in the vertical direction Z.

Also, as shown in FIG. 5, in a state in which the raising/lowering unit 32 has been moved to a height that corresponds to any container W among the container group WG in the support region 22, the lifting mechanism 25 moves the support portions 31 from the evacuated position to the support position and then raises the raising/lowering unit 32. As a result, the support portions 31 engage with the protruding portions 6 of that any container W, and that any container W can be lifted. At this time, in a case where another container W is stacked above that any container W, it is possible to lift both that any container W and the other container W that is stacked above that any container W. In this way, the lifting mechanism 25 can collectively lift any container W among the container group WG stacked in the support region 22 and a container W that is above that any container W.

The lifting mechanism 25, by lowering the raising/lowering unit 32 from the state in which the container W has been lifted, is able to stack one or a plurality of the containers W that are supported in the support portion 31 onto the conveyor 23. Also, in a case where a container W exists in the support region 22 of the conveyor 23, the lifting mechanism 25 can stack the one or a plurality of containers W that are supported in the support portion 31 onto the container W that exists in the support region 22 of the conveyor 23.

Container Transfer Apparatus

Figure 7:
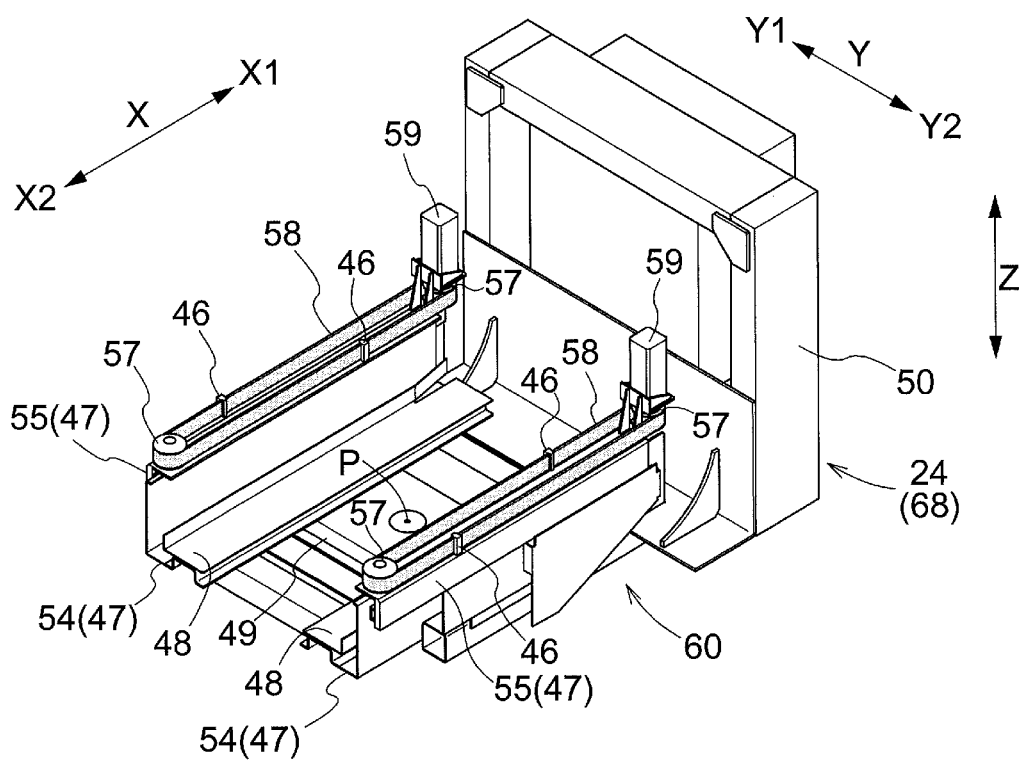
FIG. 7 is a perspective view of a transfer apparatus showing a state in which holding portions are withdrawn.
Figure 8:
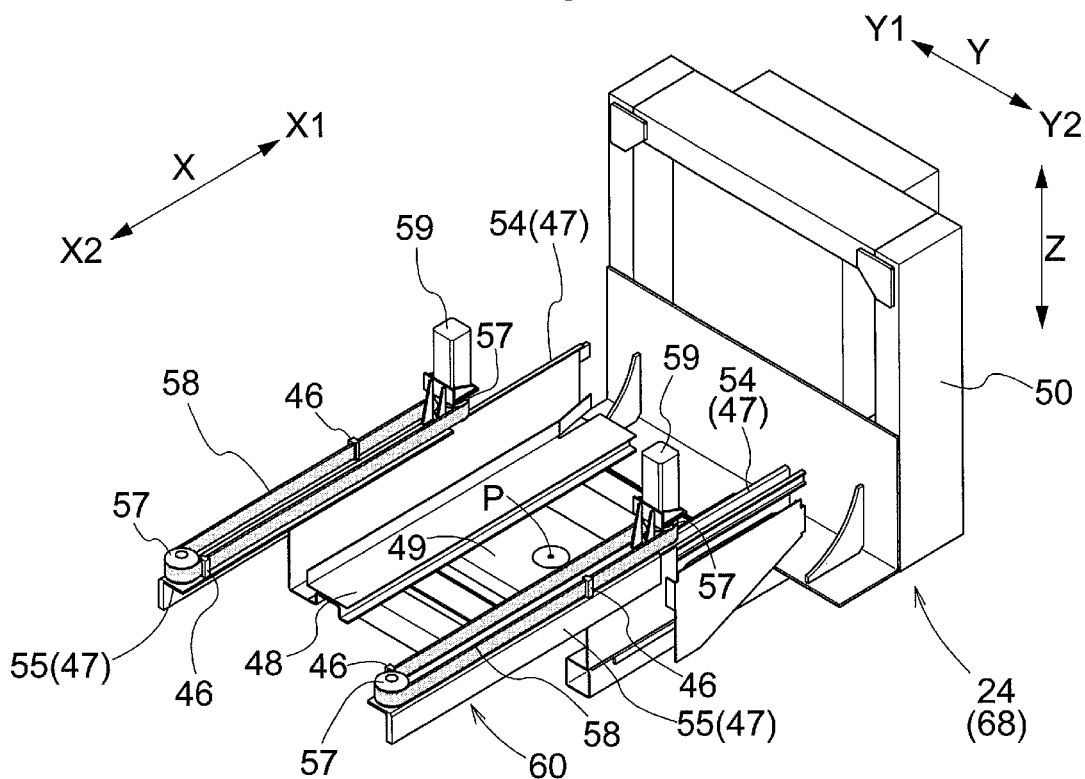
FIG. 8 is a perspective view of the transfer apparatus showing a state in which the holding portions are protruding.

As shown in FIGS. 7 and 8, the container transfer apparatus 24 is configured to move a container W while holding an outer face of the container W. The container transfer apparatus 24 is provided with holding portions 46 that hold a container W, projecting/retracting portions 47 that support the holding portions 46 and are capable of projecting and retracting in the horizontal direction, support bodies 48 that support the bottom face of the container W from below, a rotating portion 49 that supports the projecting/retracting portions 47 and the support bodies 48 and is rotatable around a vertical axis in the vertical direction Z, and a base portion 50 that supports the rotating portion 49. A pair of the holding portions 46 and a pair of the projecting/retracting portions 47 are provided in a state aligned in a direction perpendicular to the projecting/retracting direction of the projecting/retracting portions 47 when viewed from the vertical direction Z. A transfer unit 60 that transfers the container W is configured by the holding portions 46, the projecting/retracting portions 47, and the rotating portion 49. The transfer unit 60 transfers the container W between the shelf portion 11 and the support bodies 48, and also transfers the container W between the support bodies 48 and the support region 22.

As shown in FIG. 9 and the subsequent drawings, the container transfer apparatus 24 is configured to be capable of being raised/lowered, from a height where a container W supported by the support bodies 48 is positioned lower than a lowermost container W of the container group WG supported on the conveyor 23, to a height where a container W supported by the support bodies 48 is positioned higher than an uppermost container W of the container group WG in which a prescribed number (10 in the present embodiment) of the containers W have been stacked on the conveyor 23. Also, the container transfer apparatus 24 is configured to be capable of being raised/lowered to a height (a transfer height) that corresponds to the respective shelf portions 11 provided in the container shelf 1. The transfer height that corresponds to the lowermost shelf portion 11 is set to a height where a container W is supported by the support bodies 48, at a height lower than the lowermost container W of the container group WG supported on the conveyor 23.

The base portion 50 moves in the vertical direction Z along second masts 52 erected on the traveling unit 21 due to driving by the third motor 51. The base portion 50 supports the holding portions 46 in a state in which the rotating portion 49 and the projecting/retracting portions 47 are interposed between the base portion 50 and the holding portions 46, and by the base portion 50 being moved in the vertical direction Z by the third motor 51, the holding portions 46 are moved in the vertical direction Z. Note that the third motor 51 corresponds to a vertical drive unit that moves the holding portions 46 in the vertical direction Z.

The rotating portion 49 rotates around a vertical axis P in the vertical direction Z due to driving by an internal motor. The rotating portion 49 supports the projecting/retracting portions 47, and by the rotating portion 49 rotating around the vertical axis P, the projecting/retracting portions 47 rotate around the vertical axis, whereby the direction in which the holding portions 46 protrude according to the projecting/retracting portions 47 is changed around the vertical axis P. Specifically, by the rotating portion 49 rotating around the vertical axis P, the direction in which the holding portions 46 protrude according to the projecting/retracting portions 47 can be changed between at least the left-right direction first side Y1, the left-right direction second side Y2, and the front-rear direction second side X2. Note that the rotating portion 49 corresponds to a rotational drive unit that rotates the projecting/retracting portions 47 around the vertical axis P to change the direction in which the holding portions 46 protrude according to the projecting/retracting portions 47. In the following description, the state of the container transfer apparatus 24 where the direction in which the holding portions 46 protrude is set to the left-right direction first side Y1 is referred to as a first shelf transfer state, the state of the container transfer apparatus 24 where the direction in which the holding portions 46 protrude is set to the left-right direction second side Y2 is referred to as a second shelf transfer state, and the state of the container transfer apparatus 24 where the direction in which the holding portions 46 protrude is set to the front-rear direction second side X2 is referred to as a stacked transfer state.

Each of the pair of projecting/retracting portions 47 is provided with a fixing portion 54 supported by the rotating portion 49, a moving portion 55 that moves to project and retract in the horizontal direction with respect to the fixing portion 54, and a fourth motor 56 that moves the moving portion 55 to project and retract in the horizontal direction with respect to the fixing portion 54. The moving portion 55 is provided with a belt 58 wound around a pair of pulleys 57 that are rotatable around an axial center in the vertical direction Z, and a fifth motor 59 that rotationally drives one of the pair of pulleys 57. A holding portion 46 is fixed to each belt 58.

Due to projecting/retracting movement of the moving portion 55 by the fourth motor 56 and rotation of the belt 58 by the fifth motor 59, the projecting/retracting portions 47 move the holding portions 46 in the horizontal direction, thereby moving the holding portions 46 between a withdrawn position (see FIG. 7) and a protruding position (see FIG. 8) in which the holding portions 46 have been caused to protrude in the horizontal direction from the withdrawn position. Note that the projecting/retracting portions 47 correspond to a horizontal drive unit that moves the holding portions 46 in the horizontal direction.

Also, at both ends of the belt 58 (both ends in the left-right direction Y in the attitude shown in FIG. 3 and both ends in the front-rear direction X in the attitude shown in FIGS. 7 and 8), due to the holding portions 46 moving along the outer peripheral face of the pulleys 57, the distance between the holding portion 46 supported by one projecting/retracting portion 47 and the holding portion 46 supported by the other projecting/retracting portion 47 can be changed. The distance between the pair of holding portions 46 can be changed between an engagement interval at which the pair of holding portions 46 engage with the container W, and a separation interval at which the pair of holding portions 46 separate from the container W. Note that "holding the container W with the pair of holding portions 46" indicates that when the holding portions 46 have been moved to project or retract, the holding portions 46 engage with the protruding portions 6 of the container W and thus it is possible to move the container W, so it is not necessary to hold the container W sandwiched between the pair of holding portions 46.

A case where a container W being supported in the support region 22 is transferred to the support bodies 48 by the container transfer apparatus 24 will be described with reference to FIG. 11.

The container transfer apparatus 24 first rotates the rotating portion 49 around the vertical axis P, sets the container transfer apparatus 24 to the stacked transfer state, and raises/lowers the base portion 50 to raise/lower the container transfer apparatus 24 to the transfer height that corresponds to the container W to be transferred in the support region 22. Then, after switching the container transfer apparatus 24 from the withdrawn state (the state in which the holding portions 46 are positioned in the withdrawn position) to the protruding state (the state in which the holding portions 46 are positioned in the protruding position), the interval between the pair of holding portions 46 is changed from the separation interval to the engagement interval, and thus the container W is held by the pair of holding portions 46. Afterward, the holding portions 46 are moved to the withdrawn position, and the container W in the support region 22 is transferred to the support bodies 48. Note that in a case where the container W to be transferred is stacked on another container W, after the container W to be transferred is held by the pair of holding portions 46, the base portion 50 is raised to release that container W from fitting together with a container W that is adjacent below at least the front end of the container W to be transferred, and then the holding portions 46 are moved to the withdrawn position. Also, in a case where another container W is stacked on the container W to be transferred, transfer is performed by the container transfer apparatus 24 in a state in which the other container W above the container W to be transferred has been lifted by the lifting mechanism 25.

Next, a case where a container W being supported by the support bodies 48 is transferred to the support region 22 by the container transfer apparatus 24 will be described with reference to FIG. 12.

The container transfer apparatus 24 first rotates the rotating portion 49 around the vertical axis P, sets the container transfer apparatus 24 to the stacked transfer state, and raises/lowers the base portion 50 to raise/lower the container transfer apparatus 24 to the transfer height in the support region 22. Then, in a state in which the container W is being held by the pair of holding portions 46 at the engagement interval, after switching the container transfer apparatus 24 from the withdrawn state to the protruding state, the container W being supported by the support bodies 48 is stacked on a container W in the support region 22. Afterward, the interval between the pair of holding portions 46 is changed from the engagement interval to the separation interval to release holding of the container W to be transferred, and then the holding portions 46 are moved to the withdrawn position. Note that in a case where a container W does not exist in the support region 22, the container W to be transferred is transferred onto the conveyor 23. Also, in a case where a container W is to be transferred to a transfer target position at an intermediate position in the stacked container group WG, transfer is performed by the container transfer apparatus 24 in a state in which the container W above the transfer target position has been lifted by the lifting mechanism 25.

In a case where a container W being supported on a shelf portion 11 is to be transferred to the support bodies 48 by the container transfer apparatus 24, or a case where a container W being supported by the support bodies 48 is to be transferred to a shelf portion 11 by the container transfer apparatus 24, the container transfer apparatus 24 is operated in a similar manner as when transferring a container W being supported by the support bodies 48 to the support region 22, other than setting the state of the container transfer apparatus 24 to the first shelf transfer state or the second shelf transfer state instead of the stacked transfer state, or raising the base portion 50 in order to pass over the first restriction body 13 even in a case where the container W to be transferred is not stacked. Therefore, a description of that operation is omitted here.

Article Transfer Apparatus

The transport vehicle 2 includes an article transfer apparatus 26 that transfers articles. The article transfer apparatus 26 is configured to remove an article being stored in a container W from an opening portion of the container W and hold the article, and transfer an article that has been recognized by a recognition apparatus 27 between a container W in a first state and a container W in a second state. The article transfer apparatus 26 transfers an article whose image has been captured by a first image capturing apparatus 27A from a container W in the first state to a container W in the second state. Also, the article transfer apparatus 26 transfers an article whose image has been captured by a second image capturing apparatus 27B from a container W in the second state to a container W in the first state. The article transfer apparatus 26 is supported by a support frame 29 supported by an upper frame 28.

As shown in FIG. 9, the article transfer apparatus 26 includes a pedestal portion 61, a turning portion 62, a first arm 63, a second arm 64, a third arm 65, and an article holding portion 66. The pedestal portion 61 is fixed to the upper frame 28. The turning portion 62 is supported on the pedestal portion 61 so as to be capable of rotating around an axis in the vertical direction Z. A base end of the first arm 63 is swingably connected to the turning portion 62. The first arm 63 is swingable around an axis in the horizontal direction with respect to the turning portion 62. A base end of the second arm 64 is swingably connected to the tip of the first arm 63. The second arm 64 is swingable around an axis in the horizontal direction with respect to the first arm 63. The second arm 64 is configured to be rotatable around an axis in the longitudinal direction of the second arm 64 at an intermediate portion in the longitudinal direction of the second arm 64. A base end of the third arm 65 is swingably connected to the tip of the second arm 64. The article holding portion 66 is connected to the tip of the third arm 65 so as to be capable of rotating in the longitudinal direction of the third arm 65. In this way, the article transfer apparatus 26 is configured by a vertically articulated robot (a 6-axis robot).

The article holding portion 66 is provided with a suction pad that holds an article by suction, and thus is configured to hold an article by suction.

Rearrangement Apparatus

Figure 11:
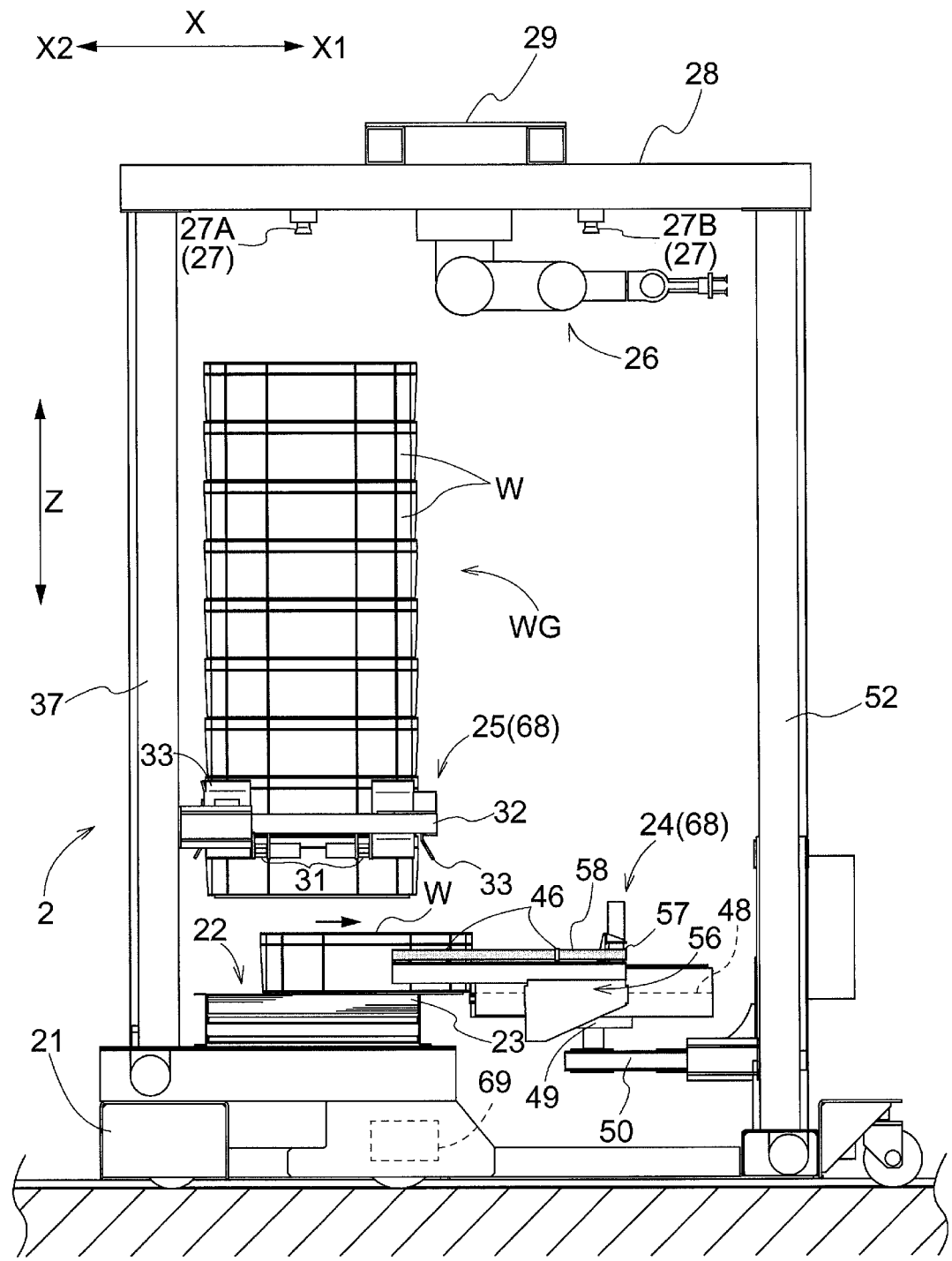
FIG. 11 is a side view of the transport vehicle showing a state when changing the order of containers with a rearrangement apparatus.
Figure 12:
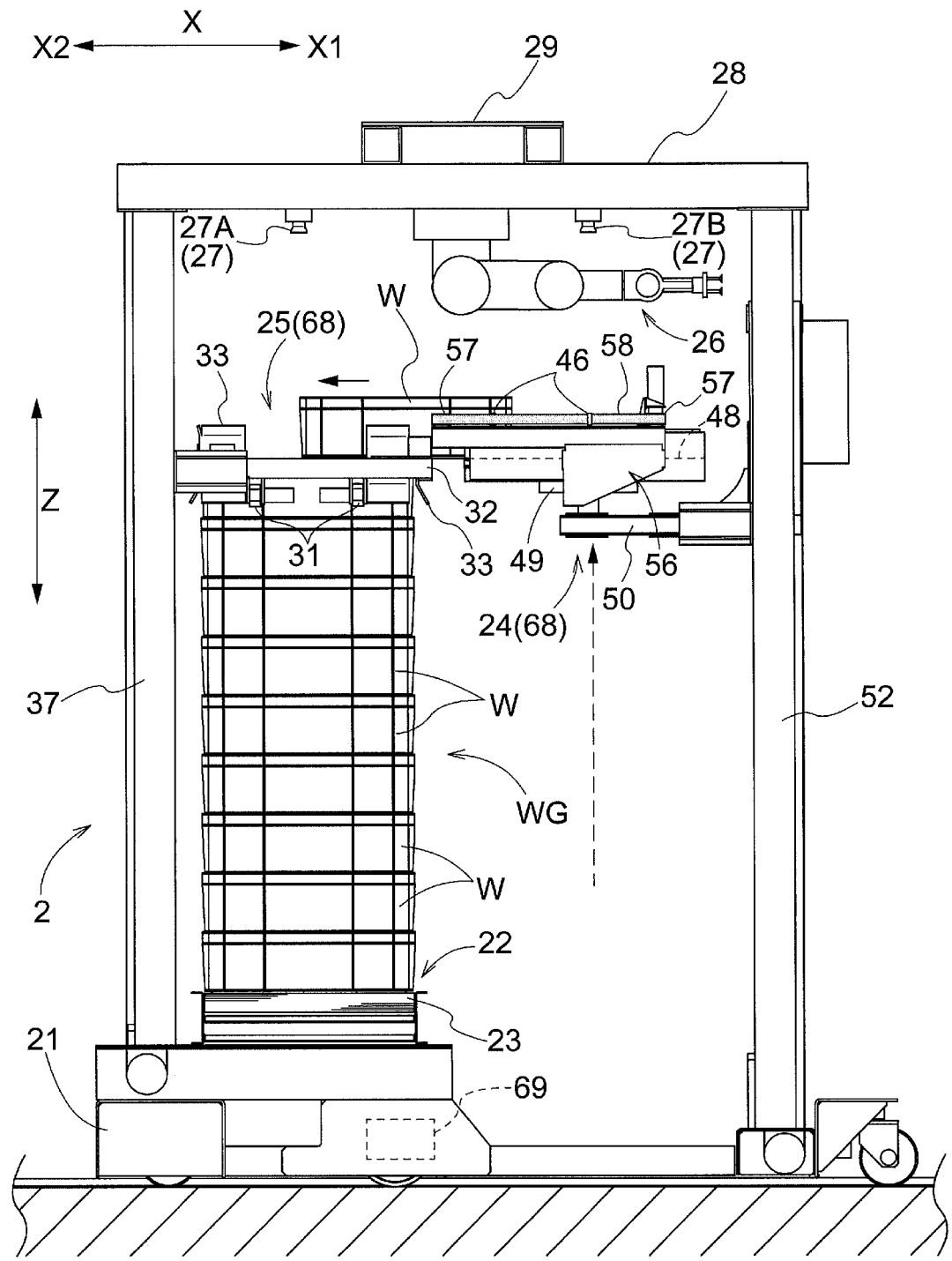
FIG. 12 is a side view of the transport vehicle showing a state when changing the order of the containers with the rearrangement apparatus.

As shown in FIGS. 11 and 12, the transport vehicle 2 includes a rearrangement apparatus 68 that changes the order of the containers W in a container group WG supported in the support region 22. The rearrangement apparatus 68 includes the lifting mechanism 25 and the container transfer apparatus 24.

The rearrangement apparatus 68 changes the order of the containers W in the container group WG as described below.

That is, first, any container W of the container group WG is lifted by the lifting mechanism 25 with respect to the container W below. Next, the container W positioned uppermost among the containers W in the container group WG that have not been lifted by the lifting mechanism 25 is transferred from the support region 22 onto the support bodies 48 by the container transfer apparatus 24.

Afterward, the lifting mechanism 25 stacks the lifted container W onto the containers W that have not been lifted, and with respect to the stacked container group WG (excluding the container W that was transferred by the container transfer apparatus 24), the container transfer apparatus 24 stacks the container W that has been transferred onto the support bodies 48.

In this way, the order of the containers W in the container group WG is changed by moving a container W one level below any container W that is lifted by the lifting mechanism 25, so as to be placed uppermost in the container group WG. In this embodiment, the any container W is the container W on the second level from the bottom in the container group WG.

Also, in a case where an article being stored in a container W in the first state cannot be recognized by the first image capturing apparatus 27A because the container W in the first state is greatly separated downward from the first image capturing apparatus 27A, the lifting mechanism 25 may lift the container W in the first state to a first set height. Specifically, when the number in the container group WG supported in the support region 22 is small (for example, when the number of containers W that constitute the container group WG is five), the height of the containers W in the first state is low and the containers W in the first state are greatly separated downward from the first image capturing apparatus 27A, so it is difficult to recognize an article stored in the containers W in the first state with the first image capturing apparatus 27A. In such a case, an article stored in the containers W in the first state is recognized by the first image capturing apparatus 27A in a state in which the containers W in the first state have been lifted to the first set height by the lifting mechanism 25. Note that in the present embodiment, the first set height is the height of the container W positioned uppermost in a state in which a container group WG including ten of the containers W has been placed on the conveyor 23.

Also, in a case where an article cannot be appropriately transferred to a container W in the first state by the article transfer apparatus 26 because the container W in the first state is greatly separated downward from the article transfer apparatus 26, the lifting mechanism 25 may lift the container W in the first state to a second set height. Specifically, when the number in the container group WG supported in the support region 22 is small (for example, when the number of containers W that constitute the container group WG is five), the height of the containers W in the first state is low and the containers W in the first state are greatly separated downward from the article transfer apparatus 26, so it is difficult to appropriately transfer an article to the containers W in the first state with the article transfer apparatus 26. In such a case, an article is transferred to a container W in the first state by the article transfer apparatus 26 in a state in which the container W in the first state has been lifted to the second set height by the lifting mechanism 25. Note that in the present embodiment, the second set height is the height of the container W positioned uppermost in a state in which a container group WG including ten of the containers W has been placed on the conveyor 23, which is the same height as the first set height.

Control Apparatus

As shown in FIG. 1, the control apparatus H sets a travel route R of a plurality of the transport vehicles 2 and controls the transport vehicles 2 such that the plurality of transport vehicles 2 travel along the travel route R. The travel route R has a route along the shelf width direction A and a route along the shelf depth direction B, and the control apparatus H controls the transport vehicles 2 to travel along the travel route R in one direction. Therefore, in the inter-shelf passageway 12 formed between two of the container shelves 1, the traveling direction of the transport vehicles 2 is one direction. Also, for example, in a case where a container group WG is placed on a transport vehicle 2 by a target carry-in/carry-out unit 3A that is one of the plurality of carry-in/carry-out units 3, and after removing articles from the containers W being stored on a plurality of target container shelves 1A that are part of the plurality of container shelves 1, the container group WG is unloaded to the target carry-in/carry-out unit 3A, the control apparatus H controls the transport vehicle 2 by transmitting, to the transport vehicle 2, a transport command for the transport vehicle 2 to travel along the travel route R indicated by the thick solid line in FIG. 1, and remove articles from the containers W being stored on the plurality of the target container shelves 1A.

Note that, in FIG. 1, the travel route R of the transport vehicles 2 is indicated by dashed-dotted lines and the thick solid line. Also, in FIG. 1, the traveling direction of the transport vehicles 2 is indicated by arrows.

Based on the transport information from the control apparatus H, a control unit 69 provided in a transport vehicle 2 controls the transport vehicle 2 as described below.

The control unit 69 executes a carry-in control for placing the container group WG on the transport vehicle 2, a transfer control for transferring articles between a container W in the second state and a container W in the first state, a carry-out control for unloading the container group WG from the transport vehicle 2, and an exchange control for exchanging containers W between the support region 22 and the shelf portion 11. In this embodiment, in the transfer control, among transfer of an article from a container W in the first state to a container W in the second state and transfer of an article from a container W in the second state to a container W in the first state, only transfer of an article from a container W in the second state to a container W in the first state is performed. The control unit 69 executes the carry-in control to place the container group WG in the carry-in unit 16 on the conveyor 23 of the transport vehicle 2, then executes the transfer control a plurality of times to store articles in each of the plurality of containers W that constitute the container group WG, and then executes the carry-out control to unload the container group WG on the conveyor 23 to the carry-out unit 18.

In the carry-in control, after controlling the traveling unit 21 such that the transport vehicle 2 stops adjacent to a carry-in unit 16, the conveyor 23 is controlled such that the container group WG is transferred from the carry-in unit 16 to the support region 22.

In the carry-out control, after controlling the traveling unit 21 such that the transport vehicle 2 stops adjacent to a carry-out unit 18, the conveyor 23 is controlled such that the container group WG is transferred from the support region 22 to the carry-out unit 18.

Next is a description of the transfer control.

In the transfer control, there are executed extraction processing to remove a container W being stored on the target container shelf 1A on the support bodies 48 with the container transfer apparatus 24, transfer processing to transfer an article from a container W in the second state to a container W in the first state with the article transfer apparatus 26, storage processing to store a container W on the support bodies 48 on the target container shelf 1A, and rearrangement processing to change the order of the containers W in the container group WG. In the transfer control, the extraction processing, the transfer processing, and the storage processing are executed in this order, and the rearrangement processing is executed as necessary. Note that, normally, the rearrangement processing is executed after the storage processing. However, in a case where the container W where an article was stored by the transfer control is the last container W (when an article has been stored in all of the containers W that constitute the container group WG by the transfer control), for example, the rearrangement processing is not performed in the transfer control in some cases.

In the extraction processing, the container transfer apparatus 24 is controlled such that after the container transfer apparatus 24 has been raised/lowered to a transfer height corresponding to the shelf portion 11 supporting the container W to be extracted in the target container shelf 1A, the container W to be extracted is transferred from the shelf portion 11 to the support bodies 48. By executing the extraction processing in this way, the container W to be extracted, which was stored on the target container shelf 1A, is supported on the support bodies 48 and becomes a container W in the second state.

In the storage processing, the container transfer apparatus 24 is controlled such that after the container transfer apparatus 24 has been raised/lowered to a transfer height corresponding to the shelf portion 11 where the container W supported by the support bodies 48 was being stored, the container W is transferred from the support bodies 48 to the shelf portion 11.

In the transfer processing, the article transfer apparatus 26 is controlled such that the position, type, or the like of an article being stored in a container W in the second state is recognized based on image capturing information of the second image capturing apparatus 27B, and the removal target article to be removed from the container shelf 1 is transferred from the container W in the second state to a container W in the first state. Afterward, in the transfer processing, the position, type, or the like of the article being stored in the container W in the first state is recognized by the first image capturing apparatus 27A, and it is confirmed whether transfer of the article is being appropriately performed by the article transfer apparatus 26.

Also, in the transfer processing, the article transfer apparatus 26 is controlled such that the position, type, or the like of an article being stored in a container W in the first state is recognized based on image capturing information of the first image capturing apparatus 27A, and the removal target article to be stored on the container shelf 1 is transferred from the container W in the first state to a container W in the second state. Afterward, in the transfer processing, the position, type, or the like of the article being stored in the container W in the second state is recognized by the second image capturing apparatus 27B, and it is confirmed whether transfer of the article is being appropriately performed by the article transfer apparatus 26. Note that the uppermost container W in the container group WG being supported in the support region 22 is a container W in the first state.

In the rearrangement processing, first, the lifting mechanism 25 and the container transfer apparatus 24 are controlled such that a container W of any height among the container group WG is lifted by the lifting mechanism 25, and a container W positioned one level below the container W of any height among the container group WG is transferred from the support region 22 onto the support bodies 48 by the container transfer apparatus 24. In the rearrangement processing, next, the lifting mechanism 25 and the container transfer apparatus 24 are controlled such that the container W of any height that has been lifted is lowered by the lifting mechanism 25, and a container W (the container W positioned one level below the container W of any height) is placed on the uppermost container W in the container group WG by the container transfer apparatus 24. In this way, by executing the rearrangement processing, the container W positioned one level below the container W of any height is placed in the container group WG to become the uppermost container W, and also becomes a container W in the first state.

In the present embodiment, the container W of any height among the container group WG is adopted as the container W on the second level from the bottom in the container group WG. Therefore, in the rearrangement processing, first, the lifting mechanism 25 and the container transfer apparatus 24 are controlled such that the container W on the second level from the bottom in the container group WG is lifted by the lifting mechanism 25, and the lowermost container W in the container group WG is transferred from the support region 22 onto the support bodies 48 by the container transfer apparatus 24. In the rearrangement processing, next, the lifting mechanism 25 and the container transfer apparatus 24 are controlled such that the container group WG (other than the lowermost container W) that was lifted is lowered onto the conveyor 23 by the lifting mechanism 25, and the container W positioned lowermost is placed on the uppermost container W in the container group WG by the container transfer apparatus 24. In this way, by executing the rearrangement processing, the container W positioned lowermost is placed in the container group WG to become the uppermost container W, and also becomes a container W in the first state.

In a case where, in the transfer control, it is not possible to recognize the position, type, or the like of an article being stored in a container W in the second state based on image capturing information of the second image capturing apparatus 27B, or it is not possible to hold the article being stored in the container W in the second state with the article transfer apparatus 26, the control unit 69 cancels the transfer control and executes an exchange control. The exchange control is a control for transferring a container W in a second state from the support bodies 48 to the support region 22, and transferring an empty container W in the container group WG in the support region 22 from the support region 22 to the shelf portion 11. In the exchange control, first container transfer processing and second container transfer processing are executed in this order.

In the first container transfer processing, the container transfer apparatus 24 is controlled such that a container W in the second state is transferred from the support bodies 48 to the support region 22. In the first container transfer processing, the container W in the second state may be transferred so as to be placed uppermost in the container group WG, or may be transferred such that a container W is lifted by the lifting mechanism 25 and the container W in the second state is placed one level below that lifted container W.

In the second container transfer processing, the container transfer apparatus 24 is controlled such that an empty container W selected from the container group WG is transferred from the support region 22 to the shelf portion 11. In this second container transfer processing, in a case where the uppermost container W in the container group WG is empty, this uppermost container W may be transferred to the shelf portion 11, and in a case where the container W below the uppermost container W is empty, this container W below may be transferred to the shelf portion 11.

2. Other Embodiments

Next, other embodiments of the transport vehicle and the transport facility will be described.

(1) In the above embodiment, a configuration is adopted in which the recognition apparatus 27 recognizes both an article stored in a container W in the first state and an article stored in a container W in the second state, but a configuration may also be adopted in which the recognition apparatus 27 recognizes only an article stored in a container W in the first state or an article stored in a container W in the second state.

Specifically, for example, a configuration may be adopted in which, in a case where an article that has been recognized by the recognition apparatus 27 is transferred only from a container W in the first state to a container W in the second state, among the first image capturing apparatus 27A and the second image capturing apparatus 27B, only the first image capturing apparatus 27A is provided, and the recognition apparatus 27 recognizes only an article being stored in a container W in the first state. Also, a configuration may be adopted in which, in a case where the article transfer apparatus 26 only transfers an article that has been recognized by the recognition apparatus 27 from a container W in the second state to a container W in the first state, among the first image capturing apparatus 27A and the second image capturing apparatus 27B, only the second image capturing apparatus 27B is provided, and the recognition apparatus 27 recognizes only an article being stored in a container W in the second state.

(2) In the above embodiment, the container transfer apparatus 24 is configured such that the holding portions 46 are engaged with a face facing the left-right direction Y of a container W in the support region 22 in order to transfer the container W, but the configuration of the container transfer apparatus 24 may be appropriately modified. For example, the container transfer apparatus 24 may be configured such that the holding portions 46 are engaged with engagement receiving portions provided in a face facing the front-rear direction first side X1 of the container W in the support region 22 in order to transfer the container W. Also, the container transfer apparatus 24 may be configured such that the container W in the support region 22 is held sandwiched between a pair of the holding portions 46 in the left-right direction Y in order to transfer the container W.

(3) In the above embodiment, a plurality of the containers W are supported in a stacked state in the support region 22, and the transport vehicle 2 further includes the rearrangement apparatus 68 that changes the order of the containers W in the container group WG stacked in the support region 22, but a configuration may be adopted in which only one container W is supported in the support region 22, and the transport vehicle 2 does not include the rearrangement apparatus 68.

(4) In the above embodiment, the order of the containers W in the container group WG is changed using the lifting mechanism 25 and the container transfer apparatus 24, and the container transfer apparatus 24 constitutes part of the rearrangement apparatus 68, but a configuration may also be adopted in which a second transfer apparatus is provided separately from the container transfer apparatus 24, the order of the containers W in the container group WG is changed using the lifting mechanism 25 and the second transfer apparatus, and the container transfer apparatus 24 does not constitute part of the rearrangement apparatus 68.

(5) In the above embodiment, the container transfer apparatus 24 stores a container W removed from the container shelf 1 at the position where the container W was stored in the container shelf 1 after article removal was completed. However, a configuration may also be adopted in which, when transferring a container W removed from the container shelf 1 in the support region 22, the container transfer apparatus 24 transfers the container W removed from the container shelf 1 in the support region 22 and stacks this container W uppermost in the container group WG, or stacks this container W in the midst of the container group WG by inserting this container W below any container W that has been lifted by the lifting mechanism 25. Also, a configuration may be adopted in which a container W that is uppermost in the container group WG or a container W one level below any container W that has been lifted by the lifting mechanism 25 is stored on the container shelf 1.

(6) In the above embodiment, the container group WG in the support region 22 is supported by the transport face of the conveyor 23, but a configuration may also be adopted in which a support base that does not have a transport function is provided in the support region 22, and the container group WG in the support region 22 is supported by an upper face of the support base.

(7) In the above embodiment, a non-deformable container configured with a resin material is used as the container W, but a foldable container may be used as the container W, or a deformable bag-like object configured with a cloth material or a plastic material may be used as the container W.

(8) In the above embodiment, the control apparatus H virtually sets the travel route R, except for part of the travel route R, and controls the transport vehicle 2 so as to travel along that travel route R, but a configuration may also be adopted in which a guide rail 15 is installed along all of the travel route R, and the transport vehicle 2 travels along that guide rail 15. Also, in the above embodiment, the guide rail 15 is installed on the floor, and the transport vehicle 2 is guided by the guide rail 15, but a configuration may also be adopted in which a guide body other than a guide rail such as magnetic tape is installed on the floor, and thus the transport vehicle 2 is guided by a guide body other than the guide rail 15.

(9) In the above embodiment, the article holding portion is provided with a suction pad to hold an article by suction. However, a configuration may also be adopted in which the article holding portion is provided with a gripping portion that grips an article to hold the article by gripping, and the mode in which the article holding portion holds an article may be changed as appropriate.

(10) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

3. Summary of the Above Embodiments

Following is a summary of the transport vehicle and the transport facility described above.

A transport vehicle travels along a container shelf provided with a plurality of levels of shelf portions arranged in a vertical direction and configured to support containers, thereby transporting the containers.

The transport vehicle is provided with a support region where a container is supported; a container transfer apparatus that inserts/takes a container into/out of the container shelf; a recognition apparatus that recognizes at least one of an article stored in a container in a first state in which the container is supported in the support region and an article stored in a container in a second state in which the container is supported by the container transfer apparatus; and an article transfer apparatus that transfers an article recognized by the recognition apparatus between a container in the first state and a container in the second state.

According to this configuration, a container that has been removed from the container shelf by the container transfer apparatus is supported by the container transfer apparatus. Also, by the article transfer apparatus, an article can be transferred between a container in the second state in which the container is supported by the container transfer apparatus in this way, and a container in the first state in which the container is supported in the support region. Then, the container in the second state for which removal or storage of the article is completed can be stored on the container shelf by the container transfer apparatus.

Thus, with respect to a container that has been removed from the container shelf by the container transfer apparatus, removal or storage of an article can be performed in the transport vehicle. Therefore, it is not necessary to transport a container that has been removed from the container shelf with the transport vehicle, and as a result, it is possible to efficiently store an article in the container or remove an article from the container.

Here, it is suitable to adopt a configuration in which the recognition apparatus recognizes an article being stored in a container in the first state, and the article transfer apparatus transfers the article recognized by the recognition apparatus from the container in the first state to a container in the second state.

According to this configuration, by recognizing an article being stored in a container in the first state with the recognition apparatus, it is possible to appropriately remove the recognized article from the container in the first state and hold the recognized article with the article transfer apparatus, so it is possible to appropriately transfer the article from the container in the first state to a container in the second state with the article transfer apparatus.

Also, it is suitable to adopt a configuration in which the recognition apparatus recognizes an article being stored in a container in the second state, and the article transfer apparatus transfers the article recognized by the recognition apparatus from the container in the second state to a container in the first state.

According to this configuration, by recognizing an article being stored in a container in the second state with the recognition apparatus, it is possible to appropriately remove the recognized article from the container in the second state and hold the recognized article with the article transfer apparatus, so it is possible to appropriately transfer the article from the container in the second state to a container in the first state with the article transfer apparatus.

Also, it is suitable to adopt a configuration in which the container transfer apparatus is configured to move a container while holding an outer face of the container, and the article transfer apparatus is configured to remove an article stored in a container from an opening portion of the container while holding the article.

According to this configuration, the container transfer apparatus can support the container in a state holding the outer face of the container. In a case where an article is removed from the container by the article transfer apparatus or a case where the article is stored in the container by the article transfer apparatus, the container transfer apparatus can support the container in a state holding the outer face of the container. Therefore, since the container can be appropriately held, for example, when removing an article from the container by the article transfer apparatus, it is easy to appropriately transfer the article by the article transfer apparatus.

Also, it is suitable to adopt a configuration in which the containers are configured to be stackable in the vertical direction, the support region is configured to be capable of supporting a plurality of the containers in a stacked state, and the transport vehicle further includes a rearrangement apparatus that changes the order of the containers in a container group stacked in the support region, the container that is positioned uppermost in the container group being a container in the first state.

According to this configuration, by changing the order of the containers in a container group supported in the support region by the rearrangement apparatus, it is possible to move any container among the plurality of containers that constitute the container group to uppermost in the container group, that is, it is possible to put that container in the first state. Therefore, while stacking the plurality of containers in a stacked state in the support region, the article transfer apparatus can remove or store articles with respect to all of the containers in the container group.

Also, it is suitable to adopt a configuration in which the container transfer apparatus includes a support body that supports a container and a transfer unit that transfers the container, and the transfer unit transfers the container between the shelf portion and the support body, and transfers the container between the support body and the support region.

According to this configuration, the container transfer apparatus can transfer a container removed from the shelf portion to the support region, and can store the container transferred from the support region in the shelf portion. Therefore, the degree of freedom of transport by the transport vehicle can be increased.

Also, it is suitable to adopt a configuration in which the transport vehicle further includes a lifting mechanism that lifts a container at any height among the container group stacked in the support region with respect to a container lower than the container at that any height, and the rearrangement apparatus includes the lifting mechanism and the container transfer apparatus.

According to this configuration, in addition to transferring the uppermost container of the container group from the support region, and placing another container on the uppermost container of the container group, the container transfer apparatus can transfer a container one level below a container lifted by the lifting mechanism from the support region, or place another container on a container one level below a lifted container. By combining container transfer by the container transfer apparatus and container lifting by the lifting mechanism, it is possible to change the order of the containers in the container group being supported in the support region.

Also, since the rearrangement apparatus is configured using the container transfer apparatus, it is not necessary to separately provide an apparatus that transfers a container to/from the container transfer apparatus in order to rearrange the containers, and therefore the configuration of the transport vehicle can be simplified.

Also, it is suitable to adopt a configuration in which the container transfer apparatus includes the support body such that the support body can be raised/lowered, and is configured to, in a state in which the support body has been raised/lowered to a transfer height that corresponds to a transfer target shelf portion, insert/take a container into/out of that shelf portion, and the transfer height that corresponds to a lowermost shelf portion is set to a height where a container is supported by the support body, at a position lower than a container disposed lowest in the support region.

According to this configuration, the height of the support body when inserting/taking a container into/out of the lowermost shelf portion can be a comparatively low height. Therefore, it is possible to reduce the height of the lowermost shelf portion, and as a result, for example, it is possible to increase the number of levels of shelf portions that are lined up in the vertical direction in a container shelf, and as a result, it is possible to increase the container shelf storage efficiency.

A transport facility provided with a plurality of transport vehicles includes a plurality of the container shelves, and a control apparatus that sets a travel route of the plurality of transport vehicles, and in this configuration, a passageway of the transport vehicles formed between two of the container shelves adjacent in a shelf depth direction serves as an inter-shelf passageway, and the plurality of container shelves are arranged such that a plurality of the inter-shelf passageways are formed, and the control apparatus sets a travel route of each of the transport vehicles such that a travel direction of the transport vehicles in each of the inter-shelf passageways is one direction.

According to this configuration, by forming an inter-shelf passageway between two container shelves, a transport vehicle that travels through the inter-shelf passageway is able to insert/take containers into/out of both of the two container shelves that exist on both sides in a direction perpendicular to the travel route. Also, because the travel route is set such that the travel direction of the transport vehicle is one direction, it is possible to allow a plurality of the transport vehicles to travel smoothly.

INDUSTRIAL APPLICABILITY

The technology according to the present disclosure is applicable to a transport vehicle that transports a container.

DESCRIPTION OF REFERENCE SIGNS

1: container shelf
2: transport vehicle
11: shelf portion
12: inter-shelf passageway
22: support region
24: container transfer apparatus
25: lifting mechanism
26: article transfer apparatus
27: recognition apparatus
48: support body
60: transfer unit
68: rearrangement apparatus
H: control apparatus
W: container
WG: container group
Z: vertical direction

The invention claimed is:

1. A transport vehicle that travels along a container shelf provided with a plurality of levels of shelf portions arranged in a vertical direction and configured to support containers, thereby transporting the containers, the transport vehicle comprising:
a support region where a container is supported;
a container transfer apparatus that inserts/takes a container into/out of the container shelf;
a recognition apparatus that recognizes at least one of an article stored in a container in a first state in which the container is supported in the support region and an article stored in a container in a second state in which the container is supported by the container transfer apparatus; and
an article transfer apparatus that transfers an article recognized by the recognition apparatus between a container in the first state and a container in the second state,
wherein the container transfer apparatus comprises a support body that supports a container and a transfer unit that transfers the container,
wherein the recognition apparatus comprises at least one image capturer, and
wherein the article transfer apparatus comprises a pedestal and at least one arm rotatably mounted to the pedestal.

2. The transport vehicle according to claim 1, wherein the recognition apparatus recognizes an article being stored in a container in the first state, and wherein the article transfer apparatus transfers the article recognized by the recognition apparatus from the container in the first state to a container in the second state.

3. The transport vehicle according to claim 1, wherein the recognition apparatus recognizes an article being stored in a container in the second state, and
wherein the article transfer apparatus transfers the article recognized by the recognition apparatus from the container in the second state to a container in the first state.

4. The transport vehicle according to claim 1, wherein the container transfer apparatus is configured to move a container while holding an outer face of the container, and
wherein the article transfer apparatus is configured to remove an article stored in a container from an opening portion of the container while holding the article.

5. The transport vehicle according to claim 1, wherein:
the containers are configured to be stackable in the vertical direction,
the support region is configured to be capable of supporting a plurality of the containers in a stacked state,
the container that is positioned uppermost in the container group stacked in the support region being a container in the first state.

6. The transport vehicle according to claim 5, wherein the transfer unit transfers the container between the shelf portion and the support body, and transfers the container between the support body and the support region.

7. The transport vehicle according to claim 6, further comprising:
a lift that lifts a container at any height among the container group stacked in the support region with respect to a container lower than the container at that any height, and
wherein the lift and the container transfer apparatus are configured to cooperate to perform a rearrangement function of changing the order of the containers in the container group stacked in the support region.

8. The transport vehicle according to claim 6, wherein the container transfer apparatus includes the support body such that the support body can be raised/lowered, and is configured to, in a state in which the support body has been raised/lowered to a transfer height that corresponds to a transfer target shelf portion, insert/take a container into/out of that shelf portion, and
wherein the transfer height that corresponds to a lowermost shelf portion is set to a height where a container is supported by the support body, at a position lower than a container disposed lowest in the support region.

9. A transport facility, comprising:
a plurality of container shelves;
a plurality of transport vehicles, the plurality of transport vehicles each comprising:
a support region where a container is supported;
a container transfer apparatus that inserts/takes a container into/out of the container shelves;
a recognition apparatus that recognizes at least one of an article stored in a container in a first state in which the container is supported in the support region and an article stored in a container in a second state in which the container is supported by the container transfer apparatus; and
an article transfer apparatus that transfers an article recognized by the recognition apparatus between a container in the first state and a container in the second state; and
a controller that sets a travel route of the plurality of transport vehicles,
wherein a passageway of the transport vehicles formed between two of the container shelves adjacent in a shelf depth direction serves as an inter-shelf passageway, and the plurality of container shelves are arranged such that a plurality of the inter-shelf passageways are formed,
wherein the controller sets a travel route of each of the transport vehicles such that a travel direction of the transport vehicles in each of the inter-shelf passageways is one direction,
wherein the container transfer apparatus comprises a support body that supports a container and a transfer unit that transfers the container,
wherein the recognition apparatus comprises at least one image capturer, and
wherein the article transfer apparatus comprises a pedestal and at least one arm rotatably mounted to the pedestal.

* * * * *